US010286339B2

(12) United States Patent
Crandall et al.

(10) Patent No.: US 10,286,339 B2
(45) Date of Patent: May 14, 2019

(54) FILTER SCREEN BRUSH ASSEMBLY

(71) Applicant: Halliburton Energy Services, Inc., Houston, TX (US)

(72) Inventors: James Michael Crandall, Houston, TX (US); Joseph Keith Young, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 617 days.

(21) Appl. No.: 14/941,871

(22) Filed: Nov. 16, 2015

(65) Prior Publication Data

US 2017/0136391 A1 May 18, 2017

(51) Int. Cl.
| | | |
|---|---|---|
| *B01D 29/64* | (2006.01) | |
| *E21B 27/00* | (2006.01) | |
| *B01D 35/02* | (2006.01) | |
| *A46B 9/06* | (2006.01) | |
| *A46B 3/00* | (2006.01) | |
| *A46B 9/02* | (2006.01) | |

(52) U.S. Cl.
CPC ............ *B01D 29/6415* (2013.01); *A46B 3/00* (2013.01); *A46B 9/028* (2013.01); *A46B 9/06* (2013.01); *B01D 35/02* (2013.01); *E21B 27/005* (2013.01); *A46B 2200/405* (2013.01)

(58) Field of Classification Search
None
See application file for complete search history.

(56) References Cited

U.S. PATENT DOCUMENTS

| | | | | |
|---|---|---|---|---|
| 148,557 | A * | 3/1874 | Gillespie et al. ...... | B01D 29/33 |
| | | | | 210/396 |
| 337,423 | A * | 3/1886 | Moore .................... | B01D 24/10 |
| | | | | 210/796 |
| 810,020 | A * | 1/1906 | Applegate .............. | B01D 33/06 |
| | | | | 210/396 |
| 1,033,745 | A * | 7/1912 | Smith .................... | B01D 29/114 |
| | | | | 210/107 |
| 1,510,863 | A * | 10/1924 | Rose ...................... | B01D 29/25 |
| | | | | 210/413 |
| 1,512,977 | A * | 10/1924 | Depue .................... | B01D 33/09 |
| | | | | 210/193 |
| 1,639,590 | A * | 8/1927 | Corkran ............. | B01D 29/6415 |
| | | | | 210/414 |
| 2,125,532 | A * | 8/1938 | Wells .................... | B01D 29/118 |
| | | | | D29/118 |
| RE21,639 | E * | 11/1940 | Trinkle .................. | B01D 37/02 |
| | | | | 210/250 |

(Continued)

OTHER PUBLICATIONS

Hern, Gregory, "Deepwater Wellbore Cleanup Systems", SPE 137090—*SPE Deepwater Drilling and Completions Conference*, Oct. 5-6, 2010, Galveston, Texas, USA, (2010), 1-9.

*Primary Examiner* — Robert J Popovics

(57) ABSTRACT

A filter screen brush apparatus includes a circular connecting portion that has an opening substantially centered on a longitudinal axis of the apparatus. At least one extension arm has one end coupled to the circular connecting portion and extends from the circular connecting portion along the longitudinal axis. The at least one extension arm includes an inner surface that faces the longitudinal axis. At least one brush is coupled to the inner surface of the at least one extension arm.

8 Claims, 9 Drawing Sheets

(56) References Cited

U.S. PATENT DOCUMENTS

| | | | | |
|---|---|---|---|---|
| 2,332,965 | A | * | 10/1943 | Ducommun ............ B01D 29/86 210/696 |
| 3,959,140 | A | * | 5/1976 | Legras .................. B01D 29/25 210/107 |
| 3,997,441 | A | * | 12/1976 | Pamplin, Jr. ........... B01D 29/25 210/777 |
| 4,634,524 | A | * | 1/1987 | Huber ................... B01D 33/11 210/158 |
| 5,085,771 | A | * | 2/1992 | Huang ................ B01D 29/071 210/332 |
| 5,401,396 | A | * | 3/1995 | Lescovich ............ B01D 29/118 210/108 |
| 5,851,087 | A | | 12/1998 | Berry, III |
| 6,156,213 | A | * | 12/2000 | Dudley ................. B01D 41/04 134/138 |
| 7,347,933 | B2 | | 3/2008 | Berry, III et al. |
| 7,718,055 | B2 | * | 5/2010 | Iou ..................... E04D 13/0409 210/156 |
| 9,327,219 | B2 | * | 5/2016 | Brunswick ......... B01D 29/6476 |
| 9,561,454 | B2 | * | 2/2017 | Browning ............ B01D 29/035 |
| 9,816,282 | B2 | * | 11/2017 | Chick ................... E04H 4/1245 |
| 2002/0158005 | A1 | | 10/2002 | Laing |
| 2006/0219645 | A1 | | 10/2006 | Bilanin et al. |
| 2007/0090041 | A1 | | 4/2007 | Berry, III et al. |
| 2012/0074074 | A1 | | 3/2012 | Lean et al. |
| 2013/0319104 | A1 | | 12/2013 | Schexnaider et al. |
| 2014/0048470 | A1 | | 2/2014 | Lalli |
| 2015/0165354 | A1 | * | 6/2015 | Brunswick ......... B01D 29/6476 210/94 |
| 2017/0136391 | A1 | * | 5/2017 | Crandall ............ B01D 29/6415 |

* cited by examiner

FILTER SCREEN BRUSH ASSEMBLY

BACKGROUND

Drilling fluids (e.g., drilling mud) are often circulated downhole, during drilling operations, through a mud flow line. The drilling fluids perform a number of functions including lubricating the area being drilled and removing any cuttings that are created during the drilling operations. Once the drilling fluids are returned to the surface, the cuttings may be removed and the drilling fluids may be sent back downhole. As oil well drilling becomes increasingly complex, it is desirable to collect and analyze information relating to the formation. This may be accomplished by analysis of the drilling fluids.

A suction tube may be inserted into the mud flow line to collect the fluids for analysis. The end of the suction tube that is in the mud flow is covered with a screen to reduce the amount of debris particles entering the suction tube. The screen may eventually get clogged with debris and have to be cleaned resulting in lost time during the drilling operation.

DETAILED DESCRIPTION

Some of the challenges noted above, as well as others, may be addressed by a filter screen brush assembly. The assembly includes a filter screen brush apparatus coupled to a filter screen and suction tube. Rotational movement of a brush and/or the screen with respect to the suction tube removes debris from the screen to enable more consistent mud flow through the suction tube.

Figure 1:
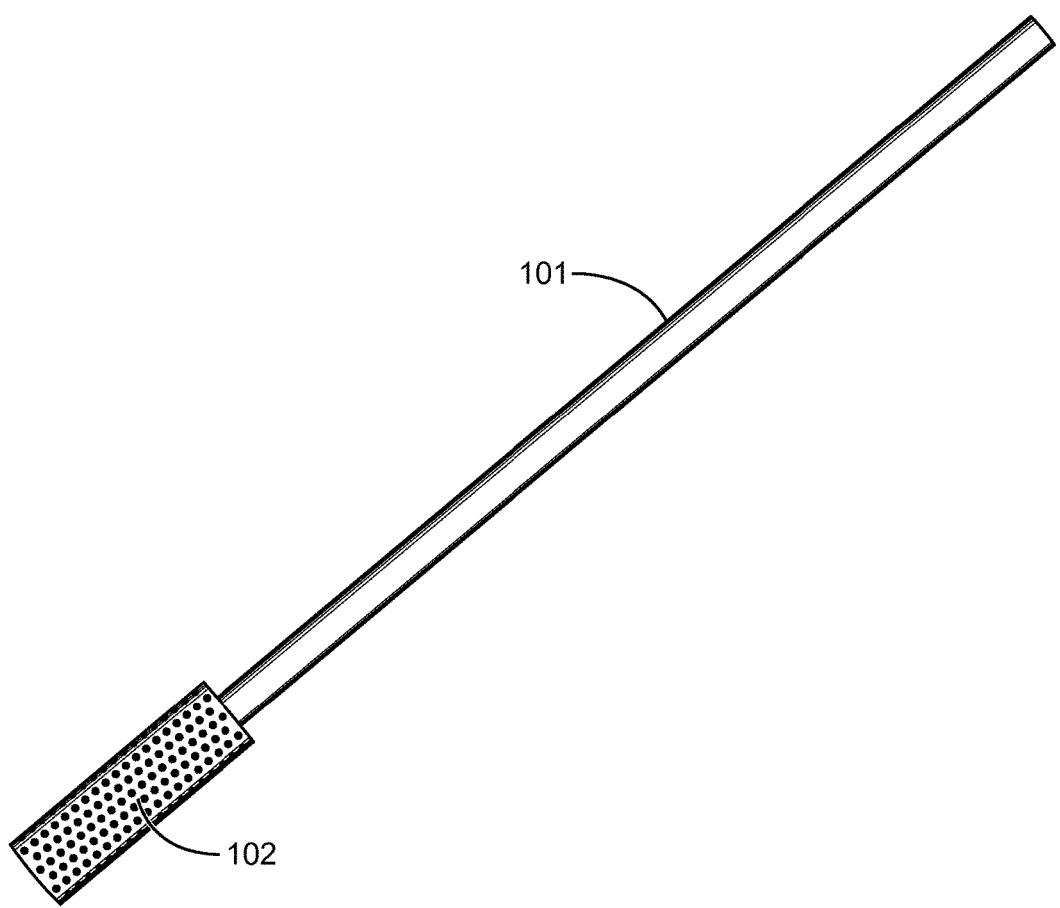
FIG. 1 is a diagram showing a suction tube and filter screen, according to various embodiments.

FIG. 1 is a diagram showing a suction tube 101 and filter screen 102, according to various embodiments. The suction tube 101 may be jointed tubing, coiled tubing, or any other type of tubing suitable for use in a subterranean well environment.

The filter screen 102 may be made of stainless steel or some other material suitable for use in the subterranean well environment (e.g., metal, metal alloy). The filter screen 102, in an embodiment, is substantially cylindrical in shape so that the filter screen brush apparatus 200 (see FIG. 2) fits over the filter screen 102 and is able to move in a rotational manner circumferentially with respect to the filter screen 102 and the suction tube 101. In an embodiment, the filter screen 102 is fixably connected to the suction tube 101. In another embodiment, the filter screen 102 is rotatably coupled to the suction tube 101 so that the filter screen 102 is able to rotate circumferentially relative to the longitudinal axis of the suction tube 101, as described subsequently.

In an embodiment, the filter screen 102 comprises a cylindrical sheet of metal with a plurality of holes to allow the fluid to pass through into an inner portion of the filter screen 102. In another embodiment, the filter screen 102 comprises a wire mesh that naturally includes the plurality of holes as a property of the mesh.

Figure 2:
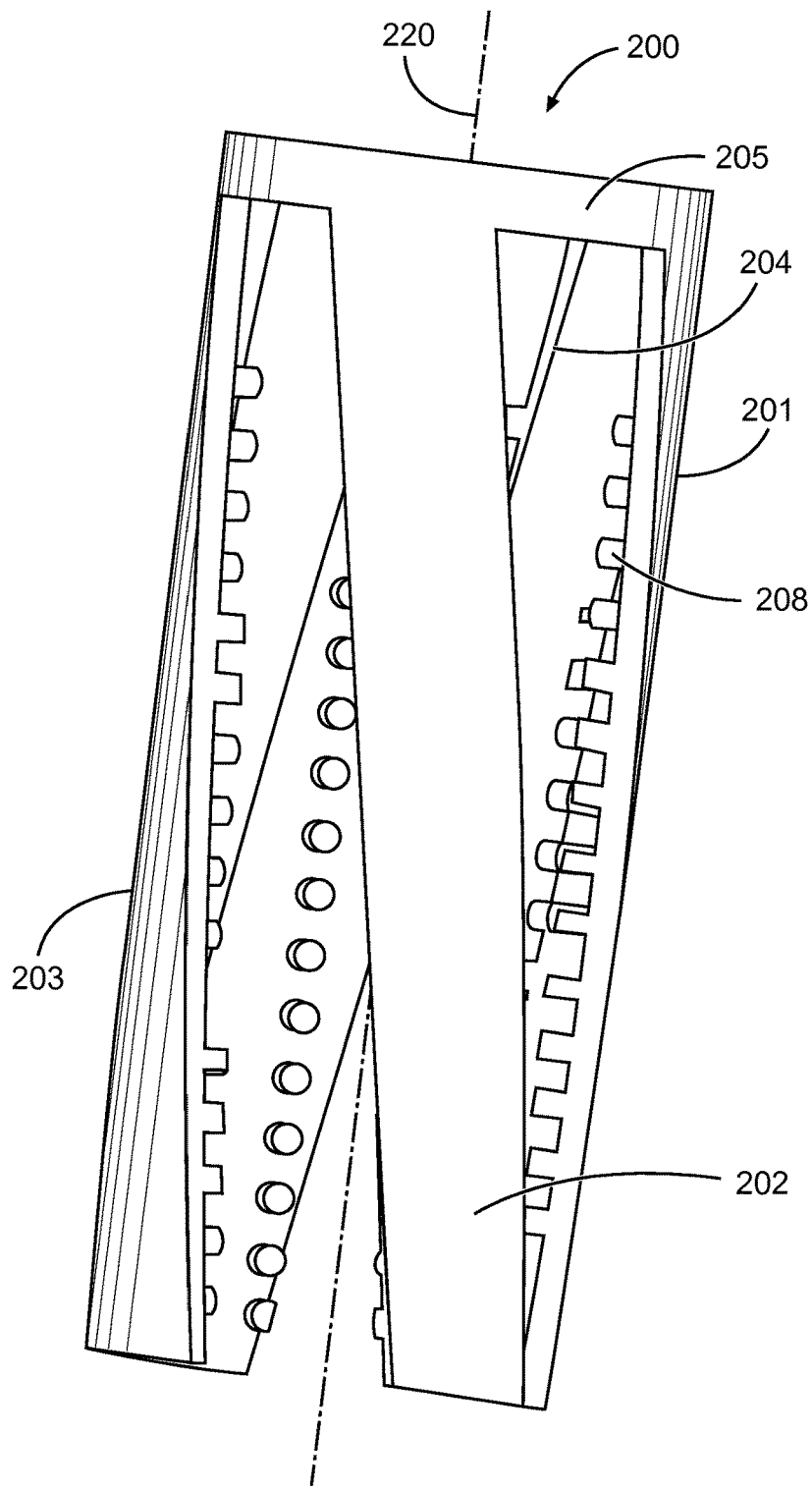
FIG. 2 is a diagram showing a filter screen brush apparatus, according to various embodiments.

FIG. 2 is a diagram showing a filter screen brush apparatus 200, according to various embodiments. The apparatus 200 includes a connecting portion 205 that couples the apparatus to the suction tube 101 of FIG. 1. An opening is extending substantially radially from a longitudinal axis 220 of the apparatus and is configured to accept the suction tube 101 during operation. The connecting portion 205, in an embodiment, may be circular and may be substantially centered on the connecting portion 205. The connecting portion 205 may include an internal bearing surface (shown and described subsequently with reference to FIG. 5) that encircles the center opening and contacts and rides on the suction tube 101 in a rotational manner relative to the longitudinal axis of the suction tube 101. The connecting portion 205 may be made of a metal or metal alloy.

At least one extension arm 201-204 has one end coupled to the connecting portion 205 and extends longitudinally therefrom. Four extension arms 201-204 are shown in FIG. 2. However, there is no certain number of extension arms 201-204 required for proper operation of the filter screen brush apparatus 200. As one example, one extension arm that is larger than those shown in FIG. 2 and that forms an arc around the cylindrical filter screen 102 may be used.

In an embodiment, the extension arms 201-204 extend longitudinally substantially parallel with the longitudinal axis of the filter screen 102. In another embodiment, the extension arms 201-204 extend longitudinally in a helical manner around the longitudinal axis 220, wherein the center point of the helix is located on the longitudinal axis 220.

The extension arms 201-204 may be made of the same material as the connection portion 205 or a different material. For example, the extension arms 201-204 may comprise a metal or metal alloy. In an embodiment, the extension arms 201-204 are made of a metal or metal alloy that provides a spring-like compression force inward towards the longitudinal axis.

The extension arms 201-204 may be coupled to the central portion 205 in any manner or the extension arms 201-204 may be formed integral with the connecting portion 205 as one unit. For example, the entire apparatus 200 may be formed as one unit via forging, molding, or 3D printing. If formed separately, the extension arms 201-204 may be bolted, welded, glued, or coupled in some other way to the connecting portion 205.

At least one brush 208 is coupled to inner surfaces of the extension arms 201-204. The brush 208 may comprise one large brush (e.g., a plurality of bristles) that covers a relatively large portion of the inner surfaces or the at least one brush 208 may comprise a plurality of brushes directly connected to the inner surfaces of respective extension arms 201-204 in a random or periodic pattern.

The brushes 208 may comprise any material that can operate in a subterranean environment while cleaning the filter screen 102 and without substantially damaging the filter screen 102. For example, the brushes 208 may include bristles having substantially similar properties as the filter screen 102, such as a metal wire (e.g., copper, stainless steel) and/or composite materials.

In an embodiment, if the extension arms 201-204 comprise a material that provides the spring-like compression force inwards towards the longitudinal axis 220, a relatively constant pressure is kept on the filter screen 102 by the brushes as the bristles on the brushes wear down. In another embodiment, the extension arms are set at a fixed distance from the longitudinal axis such that, during operation, the brush does not come in contact with an outer surface of the filter screen.

Figure 3:
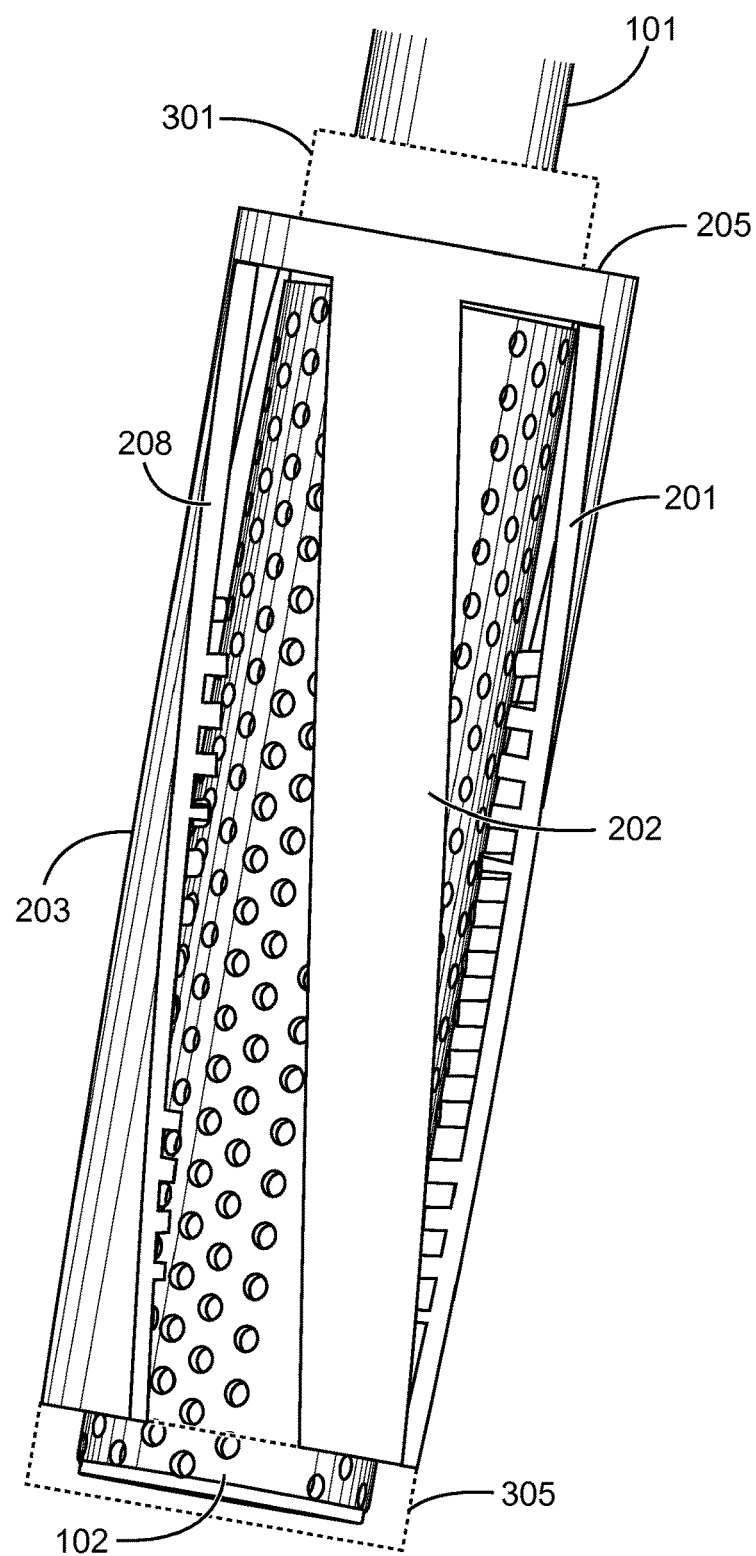
FIG. 3 is a diagram showing a filter screen brush assembly, according to various embodiments.

FIG. 3 is a diagram showing a filter screen brush assembly, according to various embodiments. The assembly comprises the filter screen brush apparatus 200, the filter screen 102, and the suction tube 101. The filter screen brush apparatus 200 is shown installed over the filter screen 102 such that the center opening in the connecting portion 205 encircles the suction tube 101. The extension arms 201-203 extend longitudinally along the outer surface of the filter screen 102 such that the plurality of brushes 208 contact the outer surface of the filter screen 102 with a substantially even pressure along the outer surface. Only three of the four extension arms 201-204 originally shown in FIG. 2 are shown in FIG. 3 due to one extension arm 204 being behind the filter screen 102.

An optional electric motor 301 may be coupled to the filter screen brush apparatus 200, the suction tube 101 and/or the filter screen 102. The motor 301, in an embodiment, may be used to rotationally drive the filter screen brush apparatus 200 and/or the filter screen. 102 as describe subsequently.

A second circular connecting portion 305 may optionally be coupled to the opposite ends of the plurality of extension arms 201-203 from the first connecting portion 205. If such a second connecting portion 305 is used, it would be desirable for the bottom to be open so that fluid and foreign matter may move out and away from the filter screen 102.

In operation, the filter screen brush apparatus 200 may be rotated circumferentially around the filter screen 102 by a force of a fluid flow, by the optional motor 301, or by both the fluid flow and the motor. One or more of the plurality of extension arms 201-203 may be shaped such that a fluid flowing over the extension arms 201-203 causes the extension arms 201-203 to move.

The rotational movement of the filter screen brush apparatus 102 causes the brushes 208 to wipe against the filter screen or pass over the filter screen at a fixed distance so as to not make contact with the filter screen 102, thus removing any particles that have adhered to the filter screen 102 outer surface and/or the holes in the filter screen 102. The rotational movement of the brushes relative to the filter screen 102 also keeps some foreign particles from coming in contact with the filter screen 102.

In another embodiment, the filter screen brush apparatus 200 is fixed to the suction tube 101 such that it does not rotate. In such an embodiment, the filter screen 102 may be made to rotate by the force of the fluid flow or by the motor 301 coupled to the filter screen 102 while the filter screen brush apparatus 200 remains stationary with respect to the suction tube. The filter screen 102 would then move with respect to the brushes resulting in substantially the same cleaning action.

In yet another embodiment, both the filter screen brush apparatus 200 and the filter screen 102 rotate in a counter-rotating manner with respect to each other. For example, the motor 301 may be geared such that the filter screen brush apparatus 200 is driven to rotate clockwise while the filter screen 102 is driven to rotate counter-clockwise. Another embodiment may reverse each of these rotational directions.

Figure 4:
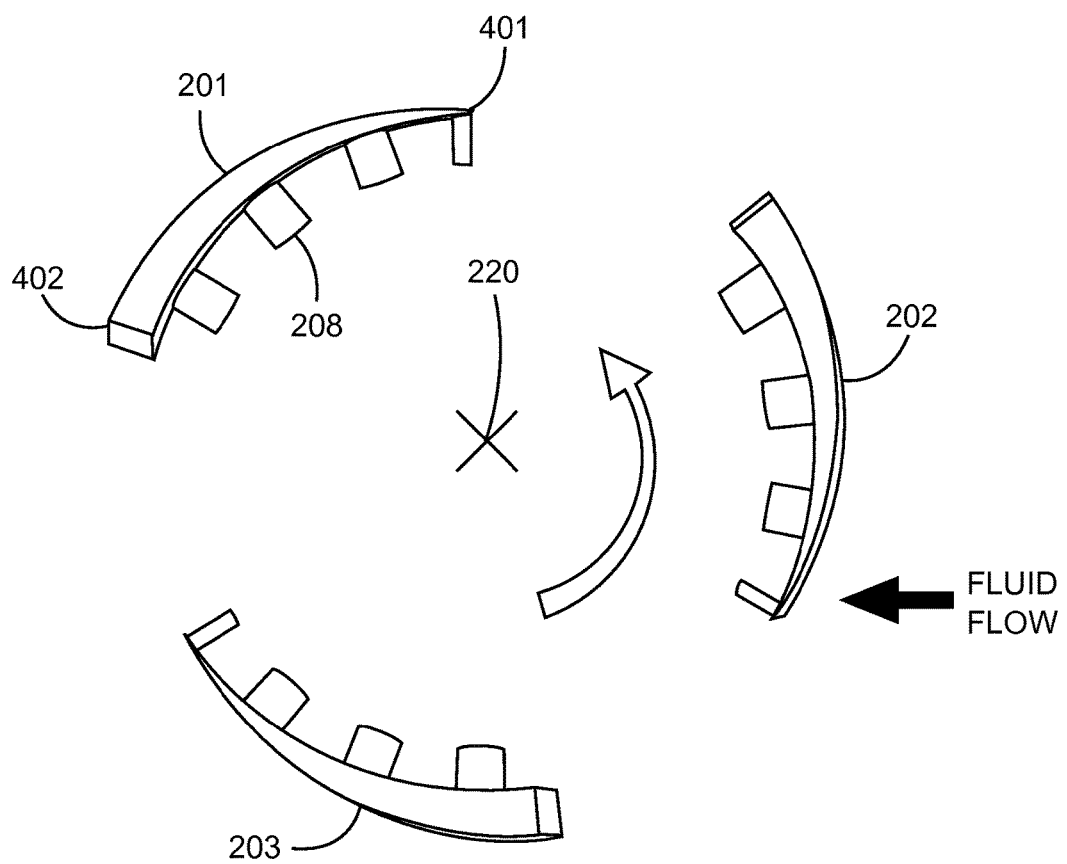
FIG. 4 is a diagram showing an end view of the filter screen brush apparatus extension arms, according to various embodiments.

FIG. 4 is a diagram showing an end view of the filter screen brush apparatus extension arms, according to various embodiments. This embodiment shows three separate extension arms 201-203 with attached brushes 208. Other embodiments may use different quantities of extension arms as well as different quantities of brushes. For example, one large brush may be coupled to each respective extension arm 201-203.

The cross-section of the extension arms show that each extension arm forms an arc around the longitudinal axis 200 and that each arc comprises a cross-sectional wedge shape. For example, the thickness of one end 401 of an extension arm 201 may be relatively thin and gradually get thicker towards the opposite end 402 of the extension arm 201. All of the extension arms 201-203 may be shaped in such a manner or any lesser number than all of the extension arms 201-203 may be shaped in such a manner.

The wedge shape of the extension arms 201-203 provides for rotation of the filter screen brush apparatus 200 by the flow of fluid. For example, if fluid flows from right to left as shown, the flow hitting the wedge shaped extension arms 201-203 causes a counter-clockwise rotation of the apparatus 200.

Figure 5:
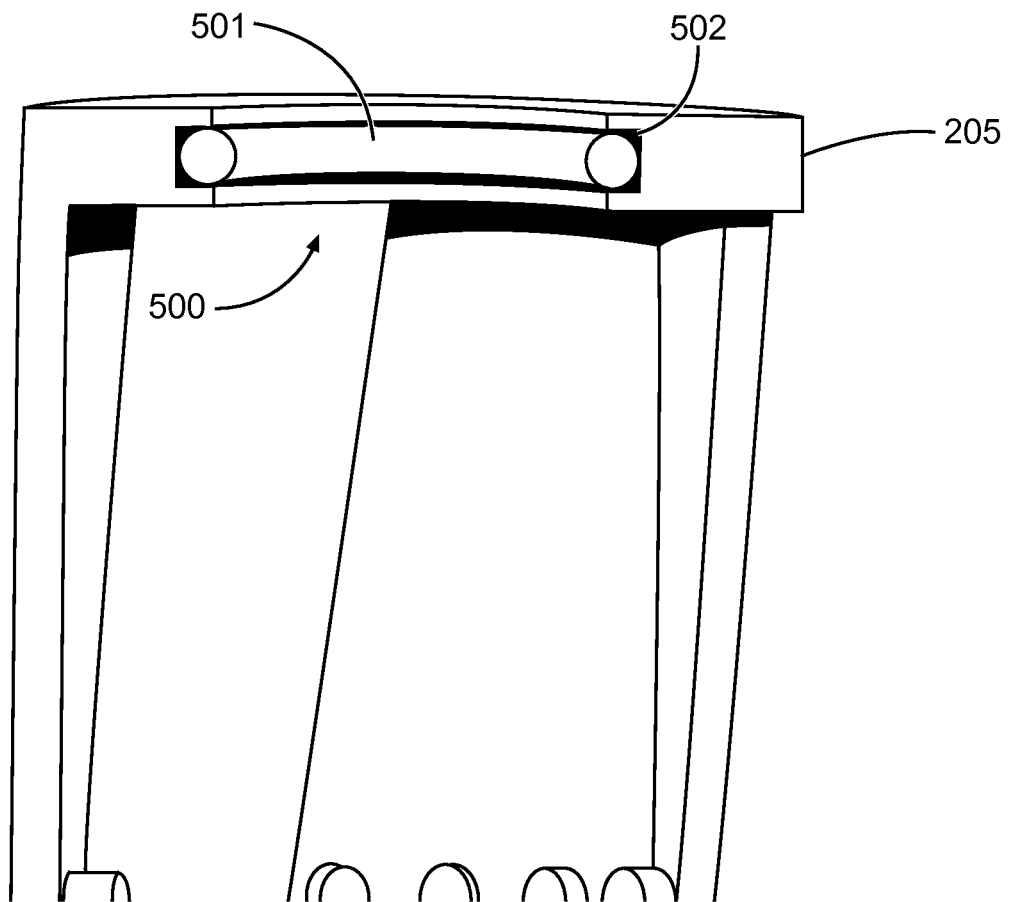
FIG. 5 is a diagram showing a cutaway view of a bearing of the filter screen brush apparatus, according to various embodiments.

FIG. 5 is a diagram showing a cutaway view of a bearing of the filter screen brush apparatus, according to various embodiments. The circular bearing 501 fits inside of a groove 502 formed in the inside surface of the opening 500 of the circular connecting portion 205. The bearing 501 is configured to encircle and contact the suction tube 101 such that, as the filter screen brush apparatus 200 rotates, the bearing surface 501 is the only portion of the apparatus 200, besides the brushes, that contacts the suction tube 101 or the filter screen 102. After the bearing 501 is worn from use, it may be removed and replaced.

Another embodiment of the apparatus 200 does not use the bearing 501. Such an embodiment would use the inside surface of the circular connecting portion to move against the suction tube 101.

Figure 6:
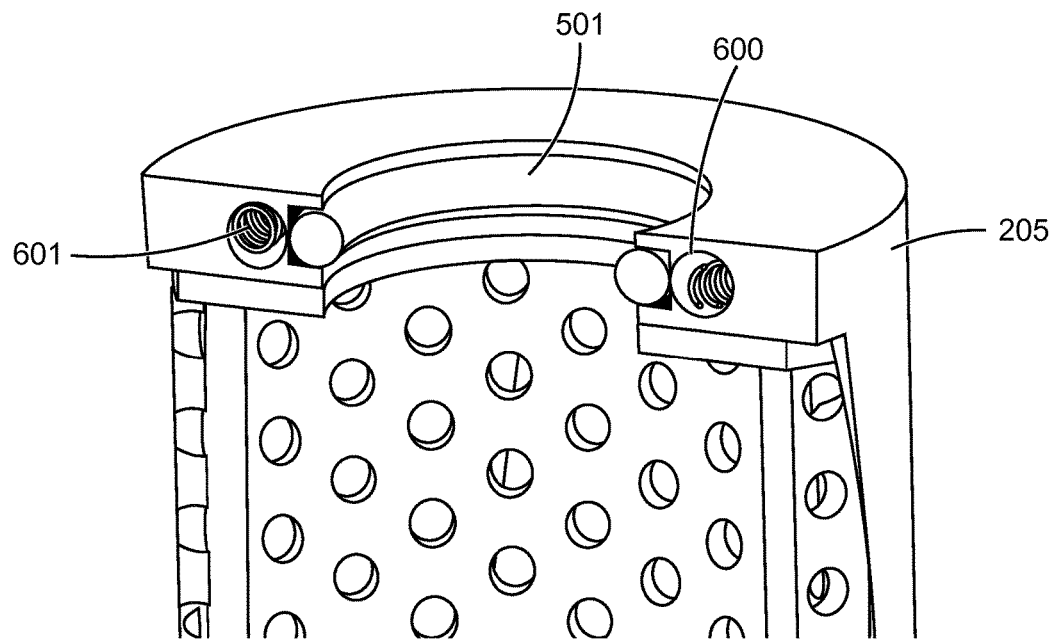
FIG. 6 is a diagram showing a cutaway view of a bearing of the filter screen brush apparatus incorporating a spring, according to various embodiments.

FIG. 6 is a diagram showing a cutaway view of a bearing 501 of the filter screen brush apparatus incorporating a spring 601, according to various embodiments. The spring may be located in a channel 600 inside the connecting portion 205. One embodiment, as shown, locates the spring 601 behind the bearing 501.

The spring may be used to exert a circular force to keep the apparatus wrapped around the suction tube 101 and the filter screen 102 as the brushes 208 wear down, if the brushes are in contact with the outer surface of the filter screen. A radial gap in the connecting portion 205 allows each end of the spring 601 to be coupled to an opposite side of the connecting portion 205 in the radial gap. Thus, the spring 601 keeps a substantially constant tension on the opposite side of the connecting portion 205 by trying to close the radial gap. The constant tension thus maintains a substantially constant force of the brushes against the filter screen as the brushes wear down.

Figure 7:
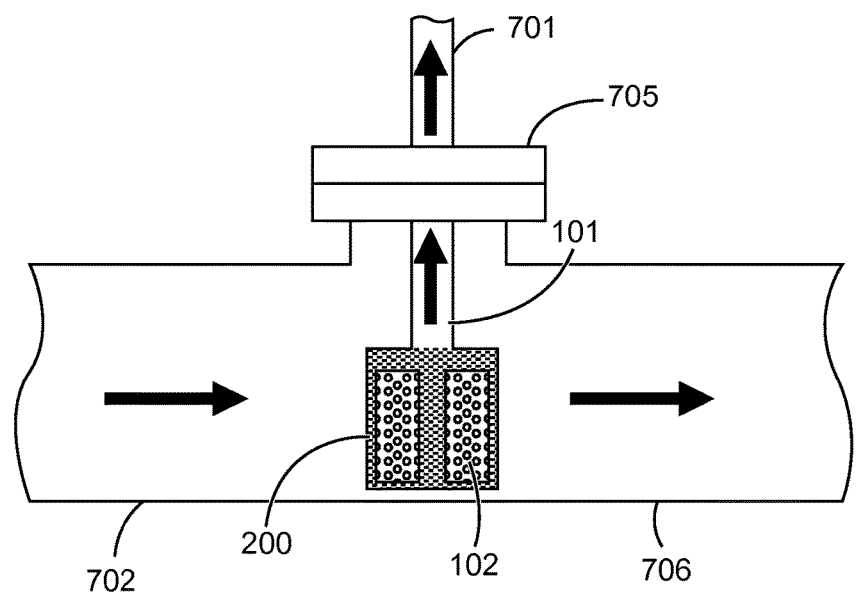
FIG. 7 is a diagram showing a cross-sectional view of a sampling system operation of the filter screen brush assembly, according to various embodiments.

FIG. 7 is a diagram showing a cross-sectional view of a sampling system operation of the filter screen brush assembly, according to various embodiments. The system shown in FIG. 7 may be part of a larger hydraulic workover (HWO) unit, as discussed subsequently with reference to FIG. 9. This is only one such use of the filter screen brush assembly since the assembly may be used during a drilling operation, as described subsequently with reference to FIG. 8, or in other applications.

The sampling system for collecting drilling fluids, in accordance with various embodiments, includes a drilling fluid that is returned to the surface from a wellbore. The inlet 702 may split into a first outlet 706 and a second outlet 701 at an inline fluid extraction body 705. The portion of the drilling fluids that flows through the first outlet 706 may be directed to a separator (not shown). The portion of the drilling fluid that flows through the second outlet 701 is referred to herein as the drilling fluid sample.

The separator may be used to separate a gas for analysis from the liquid moving through the sampling system. The processing of the drilling fluid in the separator is well known to those of ordinary skill in the art and will not be discussed in detail herein.

The fluid flows through the inlet 702, into the filter screen 102, and up through the suction tube 101. The suction tube 101 may be coupled to a pump to provide a suction to remove the fluid.

The filter screen brush apparatus 200 is shown having extension arms that are substantially parallel with the longitudinal axis of the cylindrical filter screen 102 and the suction tube 101 instead of formed in helical manner around the longitudinal axis of the filter screen 102 and suction tube 101. The filter screen brush apparatus 200 may be rotated by the fluid movement, by an optional motor, or by both the fluid movement and the motor. Such circumferential movement of the brushes around the filter screen 102 causes the brushes to remove particles from the screen 102.

Figure 8:
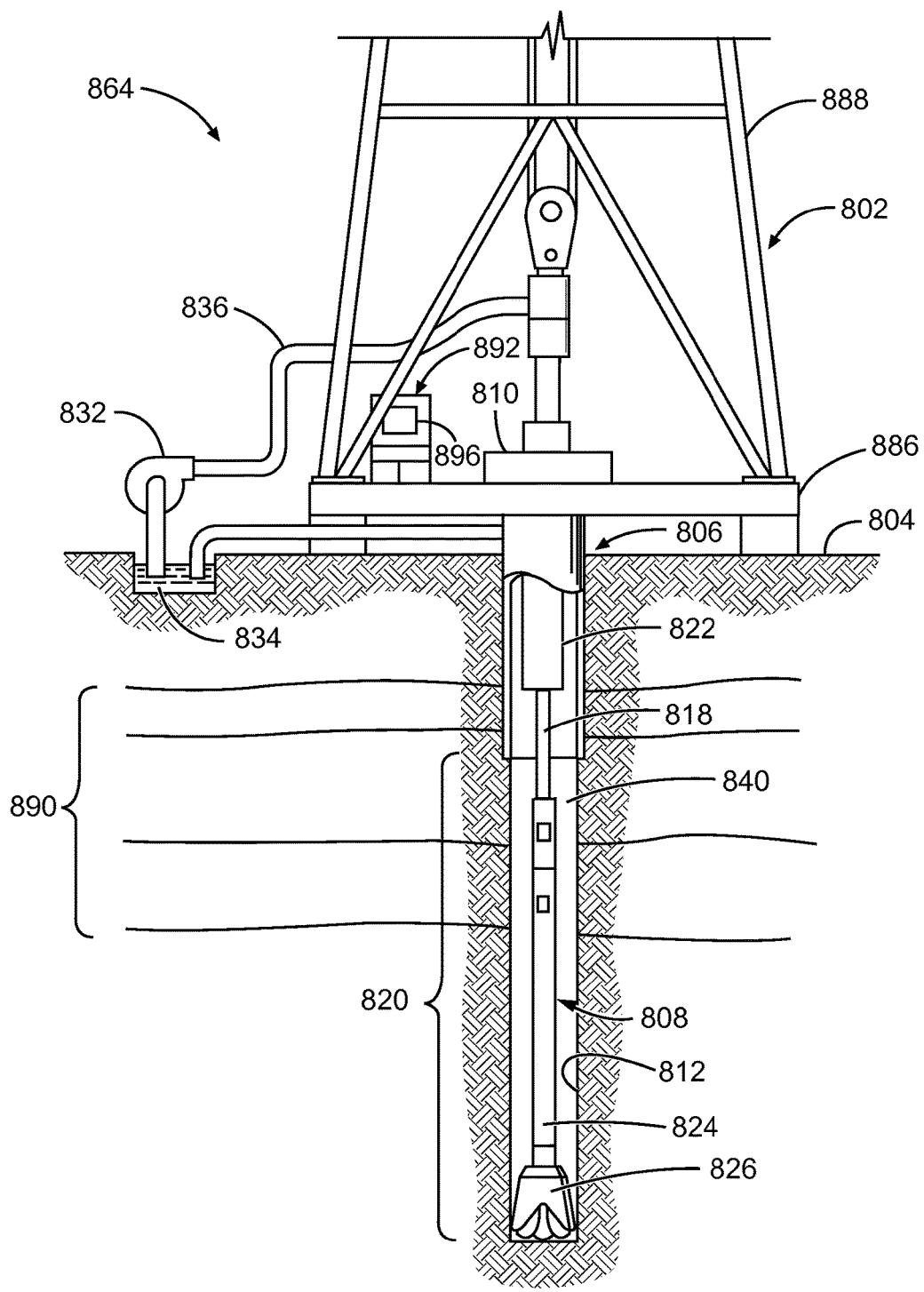
FIG. 8 is a diagram showing a drilling system, according to various embodiments.

FIG. 8 is a diagram showing a drilling system 864, according to various examples of the disclosure. The filter screen brush assembly including the filter screen brush apparatus 200 and suction tube 101 may be incorporated into any portion of the drilling system. For example, the assembly may be incorporated in the mud pit 834 or in the borehole 812.

The system 864 includes a drilling rig 802 located at the surface 804 of a well 806. The drilling rig 802 may provide support for a drillstring 808. The drillstring 808 may operate to penetrate the rotary table 810 for drilling the borehole 812 through the subsurface formations 890. The drillstring 808 may include a drill pipe 818 and the bottom hole assembly (BHA) 820 (e.g., drill string), perhaps located at the lower portion of the drill pipe 818.

The BHA 820 may include drill collars 822, a down hole tool 824, stabilizers, sensors, an RSS, a drill bit 826, as well as other possible components. The drill bit 826 may operate to create the borehole 812 by penetrating the surface 804 and the subsurface formations 890.

During drilling operations within the borehole 812, the drillstring 808 (perhaps including the drill pipe 818 and the BHA 820) may be rotated by the rotary table 810. Although not shown, in addition to or alternatively, the BHA 820 may also be rotated by a motor (e.g., a mud motor) that is located down hole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 814.

During drilling operations within the borehole 812, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 812. The drilling fluid may then be returned to the mud pit 834, where such fluid is filtered. In some examples, the drilling fluid can be used to cool the drill bit 826, as well as to provide lubrication for the drill bit 826 during drilling operations. Additionally, the drilling fluid may be used to remove subsurface formation cuttings created by operating the drill bit 826.

A workstation 892 including a controller 896 may include modules comprising hardware circuitry, a processor, and/or memory circuits that may store software program modules and objects, and/or firmware, and combinations thereof that are configured to execute methods for analyzing drilling fluid. The workstation 892 and controller 896 are shown near the rig 802 only for purposes of illustration as these components may be located at remote locations.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 9:
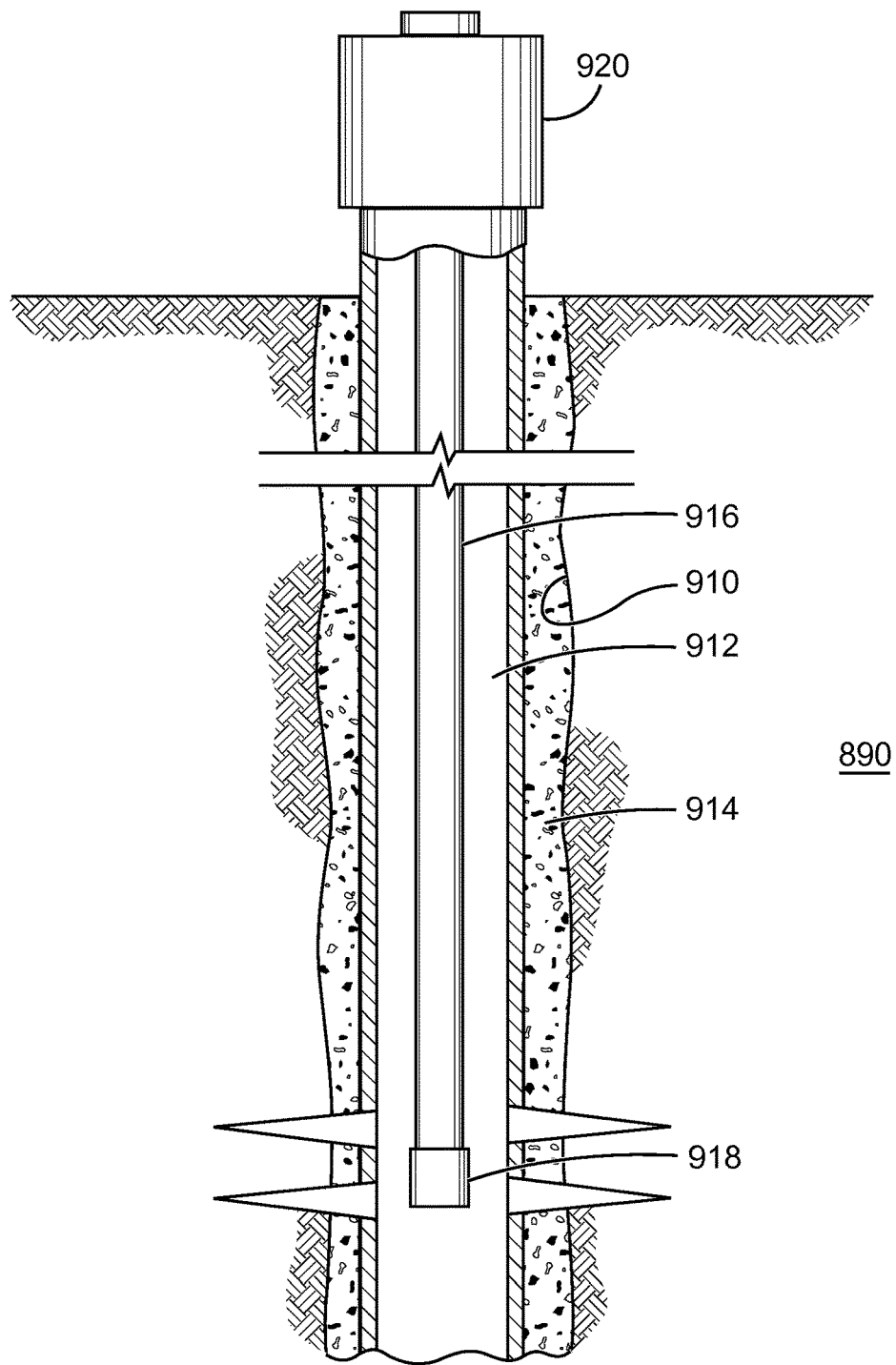
FIG. 9 is a diagram showing a cross-sectional view of a cased and cemented well bore disposed in a formation, according to various embodiments.

FIG. 9 is a diagram showing a cross-sectional view of a cased and cemented well bore disposed in a formation, according to various embodiments. In one embodiment, the filter screen brush assembly, including the filter screen brush apparatus 200 and suction tube 101, may be used in a well bore disposed in a subterranean formation. The assembly may be located in a hydraulic workover unit 920 or elsewhere.

The borehole 812 may be created so as to extend into a subterranean formation 890. For example, the drilling system of FIG. 8 may be used to form the borehole 812. In one embodiment, a casing 930 may be disposed within the borehole 912 and cement 914 may be introduced between the casing 930 and the borehole walls in order to hold the casing 930 in place and prevent the migration of fluids between the casing 930 and the borehole walls. A tubing string 916 may be disposed within the casing 930. In an embodiment, the tubing string 916 may be jointed tubing, coiled tubing, or any other type of tubing suitable for use in a subterranean well environment. Suitable types of tubing and an appropriate choice of tubing diameter and thickness may be known to one of ordinary skill in the art, considering factors such as well depth, pressure, temperature, chemical environment, and suitability for its intended use.

The hydraulic workover unit 920 may be disposed at or near the top of the tubing string 916, the casing 930, or both. The hydraulic workover unit 920 allows for the tubing 916 and other items to be introduced into the borehole 912 while a pressure exists and is maintained within the borehole 912 and tubing string 916. The existence of the pressure within the borehole 912 may be referred to as a live well condition.

The tubing string 916 may include a drill collar 918 that is a drill string component that provides weight on the bit for drilling and may be part of the Bottom Hole Assembly (BHA). Drilling related measurements may be performed downhole and information transmitted to the surface while drilling the well. Such measurements are typically referred to as Measurement While Drilling (MWD) operations. MWD tools may be conveyed downhole as part of the BHA. The tools used for MWD may be contained inside the drill collar 918 or built into the collar 18.

Figure 10:
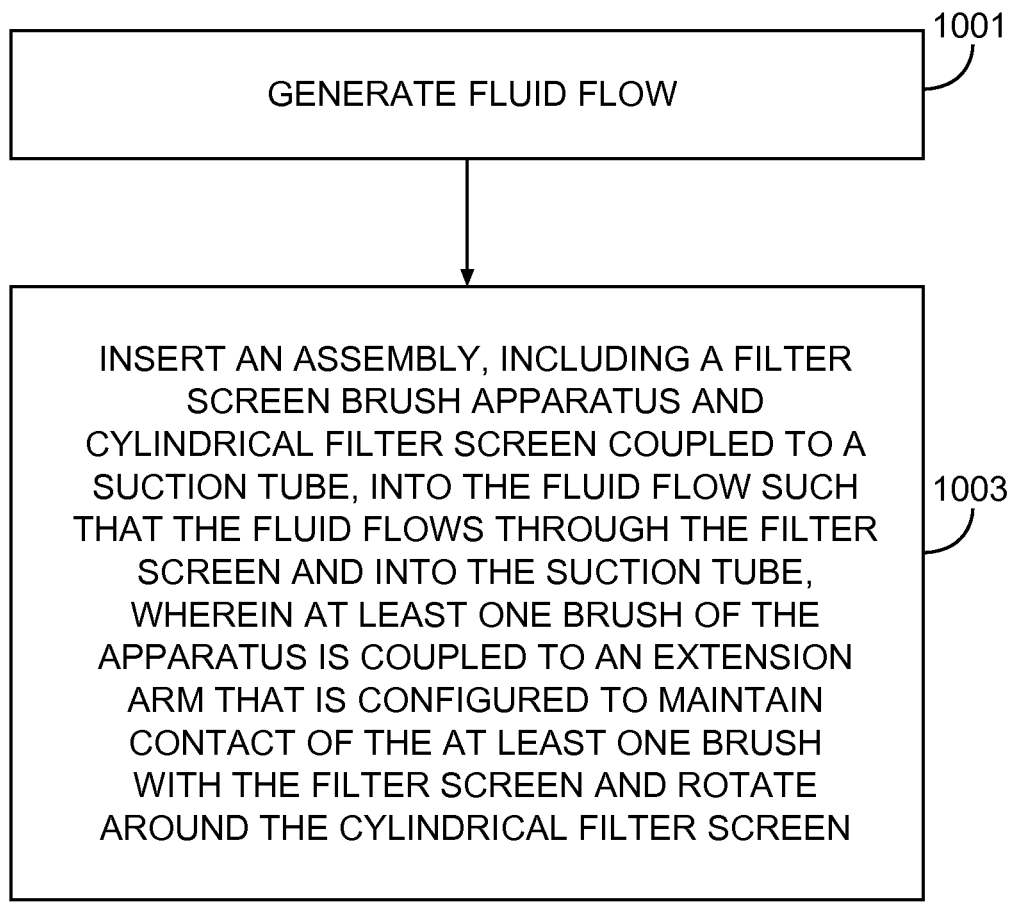
FIG. 10 illustrates a flowchart of a method for operation of the filter screen brush assembly, according to various embodiments.

FIG. 10 illustrates a flowchart of a method for operation of the filter screen brush assembly, according to various embodiments. This method is for purposes of illustration only as the assembly may be used by other methods.

In block 1001, fluid flow is generated. The fluid flow may be drilling mud.

In block 1003, an assembly, including a filter screen brush apparatus and cylindrical filter screen coupled to a suction tube, is inserted into the fluid flow such that the fluid flows through the filter screen and into the suction tube, wherein at least one brush of the apparatus coupled to an extension arm that is configured to substantially maintain contact of the at least one brush with the filter screen and rotate circumferentially around the cylindrical filter screen. The at least one brush is coupled to an inner surface of an extension arm that rotates circumferentially around an external surface of the filter screen. The circumferential rotation around an outer surface of the filter screen may be in response to fluid movement, motor driving the rotation, or both. In an embodiment, spring forces may maintain a relatively constant contact between the at least one brush and the outer surface of the filter screen.

Example 1 is an apparatus comprising: a connecting portion having an opening substantially centered on a longitudinal axis of the apparatus; at least one extension arm having one end coupled to the circular connecting portion and extending longitudinally therefrom, the at least one extension arm having an inner surface that faces the longitudinal axis; and at least one brush coupled to the inner surface of the at least one extension arm.

In Example 2, the subject matter of Example 1 can include wherein the at least one extension arm comprises a plurality of extension arms extending longitudinally from the connecting portion in a helical manner centered on the longitudinal axis.

In Example 3, the subject matter of Examples 1-2 can include wherein the at least one extension arm comprises a plurality of extension arms extending longitudinally from the connecting portion substantially parallel to the longitudinal axis.

In Example 4, the subject matter of Examples 1-3 can include a bearing disposed in a groove on an inside surface of the opening.

In Example 5, the subject matter of Examples 1-4 can include wherein the at least one brush comprises a plurality of brushes disposed on the inner surface.

In Example 6, the subject matter of Examples 1-5 can include wherein the at least one brush comprises metal and/or composite bristles.

In Example 7, the subject matter of Examples 1-6 can include wherein the at least one extension arm provides a force inward toward the longitudinal axis such that, during operation, a substantially constant force is provided on a filter screen.

In Example 8, the subject matter of Examples 1-7 can include wherein the at least one extension arm is set at a fixed distance from the longitudinal axis such that, during operation, the brush does not come in contact with the filter screen.

In Example 9, the subject matter of Examples 1-8 can include wherein the at least one extension arm forms an arc around the longitudinal axis and the arc comprises a cross-sectional wedge shape.

Example 10 is an assembly comprising: a suction tube; a cylindrical filter screen coupled to the suction tube, the filter screen having a longitudinal axis and comprising a plurality of holes; and a filter screen brush apparatus coupled to the suction tube, the apparatus comprising: a circular connecting portion having an opening that accepts the suction tube; a plurality of extension arms each having one end coupled to the circular connecting portion and extending longitudinally therefrom, the plurality of extension arms each having an inner surface that faces the filter screen; and at least one brush coupled to the inner surface of each extension arm.

In Example 11, the subject matter of Example 10 can include a motor coupled to the suction tube and the filter screen brush apparatus, wherein the motor is configured to rotate the filter screen brush apparatus around the longitudinal axis.

In Example 12, the subject matter of Examples 10-11 can include wherein the motor is configured to rotate the filter screen around the longitudinal axis in a direction opposite of the filter screen brush apparatus rotation.

In Example 13, the subject matter of Examples 10-12 can include a motor coupled to the suction tube and the filter screen, wherein the motor is configured to rotate the filter screen within the filter screen brush apparatus while the filter screen brush apparatus remains stationary with respect to the suction tube.

In Example 14, the subject matter of Examples 10-13 can include wherein the assembly is disposed in a drilling system or a hydraulic workover unit.

In Example 15, the subject matter of Examples 10-14 can include a spring disposed in a channel in the circular connecting portion wherein the spring is configured to maintain a substantially constant force of the at least one brush of each extension arm against the filter screen.

In Example 16, the subject matter of Examples 10-15 can include wherein the plurality of extension arms are configured to rotate around the filter screen in response to fluid flow past the plurality of extension arms.

Example 17 is a method comprising: generating a fluid flow; and inserting an assembly, including a filter screen brush apparatus and cylindrical filter screen coupled to a suction tube, into the fluid flow such that the fluid flows through the filter screen and into the suction tube, wherein at least one brush of the apparatus is coupled to an extension arm that is configured to rotate circumferentially around the cylindrical filter screen.

In Example 18, the subject matter of Example 17 can include wherein the extension arm is configured to substantially maintain contact of the at least one brush with the filter screen.

In Example 19, the subject matter of Examples 17-18 can include wherein the extension arm is configured to keep the at least one brush at a fixed distance from the longitudinal axis such that the brush does not contact the filter screen.

In Example 20, the subject matter of Examples 17-19 can include wherein the at least one brush is coupled to an extension arm of the filter screen brush apparatus, the method further comprising the extension arm rotating circumferentially around an outer surface of the cylindrical filter screen in response to the fluid flow.

In Example 21, the subject matter of Examples 17-20 can include wherein the at least one brush is coupled to an extension arm of the filter screen brush apparatus, the method further comprising the extension arm rotating circumferentially around an outer surface of the cylindrical filter screen in response to a motor rotating the apparatus.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. An apparatus comprising:
a connecting portion having an opening extending radially from a longitudinal axis of the apparatus;
at least one extension arm having one end coupled to the connecting portion and extending longitudinally therefrom, wherein the at least one extension arm forms an arc around the longitudinal axis from a relatively thin first end to a thicker second end such that the arc comprises a cross-sectional wedge shape; and
at least one brush coupled to an inner surface of the at least one extension arm.

2. The apparatus of claim 1, wherein the at least one extension arm comprises a plurality of extension arms extending longitudinally from the connecting portion in a helical manner centered on the longitudinal axis.

3. The apparatus of claim 1, wherein the at least one extension arm comprises a plurality of extension arms extending longitudinally from the connecting portion substantially parallel to the longitudinal axis.

4. The apparatus of claim 1, further comprising a bearing disposed in a groove on an inside surface of the opening.

5. The apparatus of claim 1, wherein the at least one brush comprises a plurality of brushes disposed on the inner surface.

6. The apparatus of claim 1, wherein the at least one brush comprises metal and/or composite bristles.

7. The apparatus of claim 1, wherein the at least one extension arm provides a force inward toward the longitudinal axis such that, during operation, a substantially constant force is provided on a filter screen.

8. The apparatus of claim 1, wherein the at least one extension arm is set at a fixed distance from the longitudinal axis such that, during operation, the brush does not come in contact with the filter screen.

* * * * *